(12) United States Patent
Kamiki et al.

(10) Patent No.: US 9,312,734 B2
(45) Date of Patent: Apr. 12, 2016

(54) ARMATURE OF LINEAR MOTOR, LINEAR MOTOR AND METHOD OF MANUFACTURING ARMATURE

(71) Applicant: KABUSHIKI KAISHA YASKAWA DENKI, Kitakyushu-shi (JP)

(72) Inventors: Yasuaki Kamiki, Kitakyushu (JP); Seigou Nagamatsu, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 88 days.

(21) Appl. No.: 13/775,254

(22) Filed: Feb. 25, 2013

(65) Prior Publication Data
US 2013/0234538 A1    Sep. 12, 2013

(30) Foreign Application Priority Data

Mar. 8, 2012 (JP) ................... 2012-052279

(51) Int. Cl.
| | | |
|---|---|---|
| H02K 41/02 | (2006.01) | |
| H02K 41/03 | (2006.01) | |
| H02K 3/34 | (2006.01) | |
| H02K 15/04 | (2006.01) | |
| H02K 3/52 | (2006.01) | |

(52) U.S. Cl.
CPC .............. *H02K 3/345* (2013.01); *H02K 3/52* (2013.01); *H02K 15/04* (2013.01); *H02K 41/031* (2013.01); *H02K 2203/12* (2013.01); *Y10T 29/49009* (2015.01)

(58) Field of Classification Search
CPC ......... H02K 3/345; H02K 15/04; H02K 3/52; H02K 41/031; H02K 41/02; H02K 41/03; H02K 2203/12; Y10T 29/49009
USPC .................... 310/12.27, 12.21, 194
See application file for complete search history.

(56) References Cited

U.S. PATENT DOCUMENTS

| | | | | |
|---|---|---|---|---|
| 7,667,368 | B2 * | 2/2010 | Matsuzaki | .......... H02K 3/524 310/194 |
| 2004/0222715 | A1 * | 11/2004 | Yamamura | .......... H02K 1/148 310/216.015 |

(Continued)

FOREIGN PATENT DOCUMENTS

| | | | |
|---|---|---|---|
| JP | 56171582 U | * | 12/1981 |
| JP | 60-026446 | | 2/1985 |
| JP | 2000-262035 | | 9/2000 |

(Continued)

OTHER PUBLICATIONS

English Machine Translation JP56171582U.*

(Continued)

*Primary Examiner* — Dang Le
*Assistant Examiner* — Leda Pham
(74) *Attorney, Agent, or Firm* — Mori & Ward, LLP

(57) ABSTRACT

An armature of a linear motor is provided. The armature includes an armature core having a plurality of teeth arranged linearly and spaced at predetermined intervals, and a plurality of bobbins fitted onto adjacent teeth, each of the bobbins having flange parts, a winding being wound around the bobbin to form a coil. At least one of the flange parts of the bobbin is formed with a first protrusion and a second protrusion. An overlapped section is formed by the first and second protrusions of two adjacent bobbins contacting or overlapping with each other.

20 Claims, 11 Drawing Sheets

(56) References Cited

U.S. PATENT DOCUMENTS

| | | | |
|---|---|---|---|
| 2006/0202567 A1* | 9/2006 | Bierlich | H02K 41/031 310/12.18 |
| 2010/0156200 A1* | 6/2010 | Busch | H02K 3/522 310/12.21 |

FOREIGN PATENT DOCUMENTS

| | | |
|---|---|---|
| JP | 2003-047229 | 2/2003 |
| JP | 2010-233418 | 10/2010 |

OTHER PUBLICATIONS

Japanese Office Action for corresponding JP Application No. 2012-052279, Feb. 12, 2014.
Korean Office Action for corresponding KR Application No. 10-2013-0025226, Sep. 5, 2014.
Chinese Office Action for corresponding CN Application No. 201310075035.7, Jan. 7, 2015.

* cited by examiner

ARMATURE OF LINEAR MOTOR, LINEAR MOTOR AND METHOD OF MANUFACTURING ARMATURE

CROSS-REFERENCE TO RELATED APPLICATION(S)

The application claims priority under 35 U.S.C. §119 to Japanese Patent Application No. 2012-052279, which was filed on Mar. 8, 2012, the entire disclosure of which is hereby incorporated by reference.

TECHNICAL FIELD

The present invention relates to a linear motor, an armature of the linear motor, and a method of manufacturing the armature.

BACKGROUND OF THE INVENTION

Conventionally, there has been a linear motor provided with a magnetic field source where a plurality of magnets are arrayed, and an armature arranged to oppose to the magnetic field source.

As one example of such an armature of the linear motor, such a configuration has been known that the armature includes an armature core having a plurality of teeth linearly arrayed at predetermined intervals, and a plurality of bobbins. Each bobbin has flange parts, is wound by a winding to form a coil, and is fitted onto each tooth.

JP2003-047229A discloses of filling the armature core with a resin to prevent the winding, which is wound around the bobbin to form the coil, from collapsing.

SUMMARY OF THE INVENTION

The present invention provides a linear motor, an armature of the linear motor, and a method of manufacturing the armature.

According to one aspect of the invention, an armature of a linear motor is provided. The armature includes an armature core having a plurality of teeth arranged linearly and spaced at predetermined intervals, and a plurality of bobbins fitted onto adjacent teeth, each of the bobbins having flange parts, a winding being wound around the bobbin to form a coil. Further, at least one of the flange parts of the bobbin is formed with a first protrusion and a second protrusion. An overlapped section is formed by the first and second protrusions of two adjacent bobbins contacting or overlapping with each other.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, embodiments of a linear motor according to the present invention are described in detail with reference to the accompanying drawings. Note that the following embodiments are not intended to limit the scope of the present invention.

First Embodiment

Figure 1:
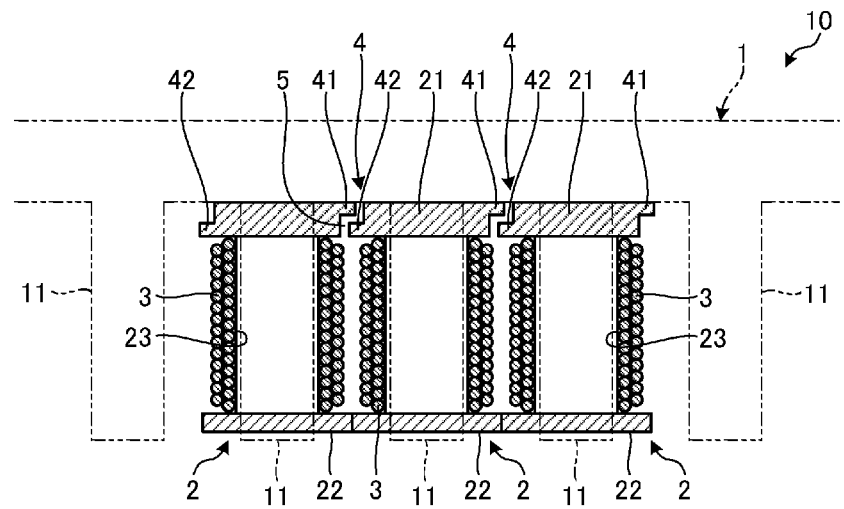
FIG. 1 is a schematic view of an armature of a linear motor according to a first embodiment of the invention.
Figure 2:
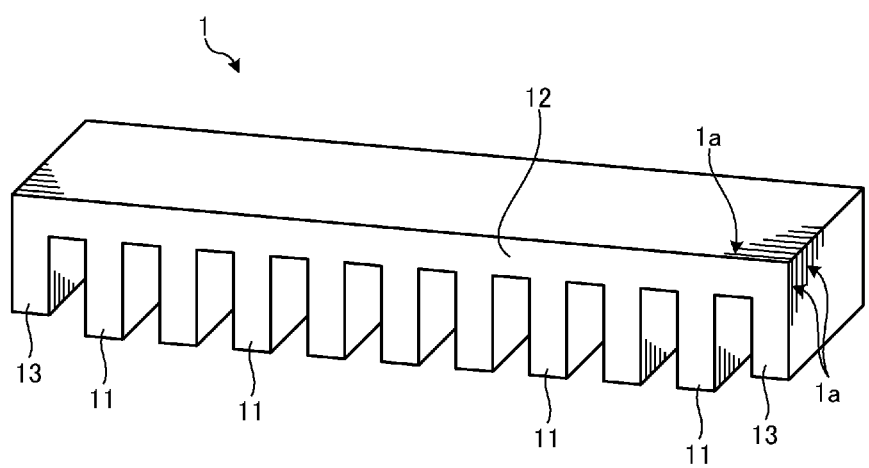
FIG. 2 is a perspective view of an armature core according to the first embodiment.
Figure 3:
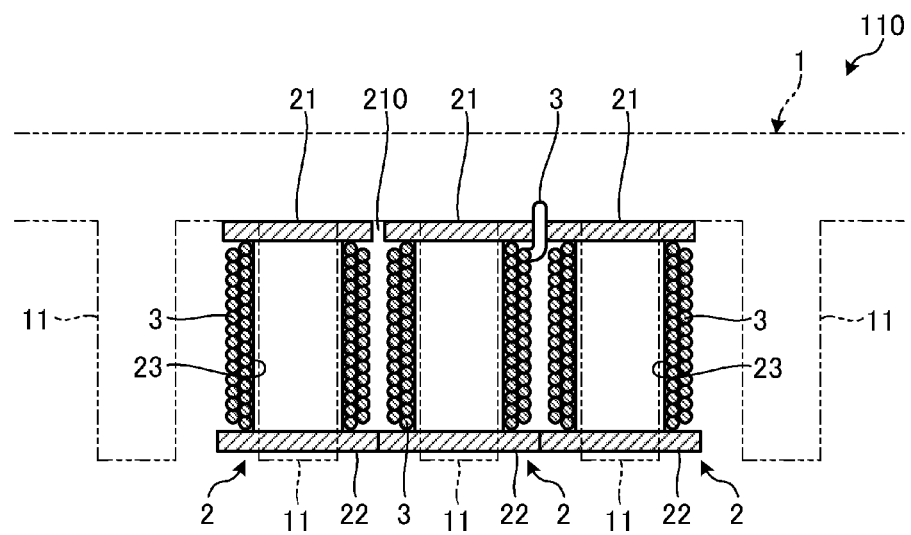
FIG. 3 is a schematic diagram of an armature according to a comparative example.

With reference to FIGS. 1 to 3, an armature 10 of a linear motor 100 (see FIG. 14) according to a first embodiment of the invention is described. FIG. 1 is a schematic view of the armature 10 of the linear motor 100 according to this embodiment. FIG. 2 is a perspective view of an armature core 1 shown in FIG. 1. FIG. 3 is a view of an armature 110 according to a comparative example.

First, a configuration of the armature 10 is briefly described with reference to FIGS. 1 and 2. As shown in FIG. 1, the armature 10 includes the armature core 1 where a plurality of teeth 11 (in this embodiment, nine teeth) are arrayed at predetermined intervals, and a plurality of bobbins 2. Each bobbin 2 has flange parts 21 and 22 and is wound by a winding 3 to form a coil. The bobbins 2 are fitted onto respective teeth 11.

Below, the bobbin 2 and the single winding 3 winding around the bobbin 2 may be comprehensively referred to as "the coil assembly." The bobbin 2 can be formed from an insulation material such as an insulating synthetic resin.

Three coil assemblies are fitted onto the armature core 1 as one set, and a three-phase current is applied through nine coil assemblies. Each coil assembly is entirely and integrally encased together with the windings 3 in a mold resin 200 (see FIG. 14) in a state where the coil assemblies are fitted onto the respective teeth 11 of the armature core 1. Thus, the coil assemblies are fixed to the teeth 11 of the armature core 1.

As shown in FIG. 2, the armature core 1 of this embodiment is formed by laminating a predetermined number of metal plates 1a. Each metal plate 1a has a yoke 12, auxiliary teeth 13 formed at both ends of the yoke 12, and the nine teeth 11 formed between the auxiliary teeth 13.

The laminated metal plates 1a are suitably adhered to each other with adhesives. Note that the metal plate 1a is preferably made of a soft magnetic material including a laminated silicon steel plate.

As shown in FIG. 1, the bobbin 2 is wound by the winding 3, and has a rectangular prismatic portion 23 into which the teeth 11 of the armature core 1 can be inserted. The flange parts 21 and 22 having a substantially rectangular frame shape are formed to project outward from the both ends of the rectangular prismatic portion 23 (i.e., project outward from upper and lower ends of the rectangular prismatic portion 23 in FIG. 1), respectively.

First and second protrusions 41 and 42 are formed in one of the flange parts 21 and 22. In this embodiment, the protrusions are formed in the upper flange part 21 positioned on the yoke 12 side (upper side in FIG. 1). In this embodiment, as shown in FIG. 1, a left-side side end face of the upper flange part 21 is formed in a step shape so that its lower portion (about half the thickness of the flange part 21) protrudes, a right-side side end face of the upper flange part 21 is formed in an inverted step shape so that its upper portion (about half the thickness of the flange part 21) protrudes. That is, the first protrusion 41 is formed in one of long side end faces (on the right side in FIG. 1) of the upper flange part 21, and the second protrusion 42 is formed in the other, opposite long side end face (on the left side in FIG. 1).

In a state where the bobbins 2 are fitted onto the plurality of teeth 11 of the armature core 1, an overlapped section 4 is formed between adjacent bobbins 2 and, more particularly, between adjacent first and second protrusions 41 and 42 which overlap with each other, as shown in FIG. 1.

As shown in FIG. 1, the first and second protrusions 41 and 42 are staggered in height (particularly in this case, forming a step joint), and overlap with each other to form the overlapped section 4. Further, a labyrinth gap 5 is formed between the adjacent flange parts 21 of two adjacent bobbins which butt joins to each other in the overlapped section 4. In other words, the labyrinth gap 5 having a curved shape (e.g., a crank shape in this embodiment) in cross section is formed between the first and second protrusions 41 and 42 of the adjacent bobbins.

As shown in FIG. 1, the flange part 22 of the bobbin 2 on the tip side (lower side in FIG. 1) of the teeth 11 of the armature core 1 is formed to be in close contact with another corresponding flange part 22 of the adjacent bobbin 2 as much as possible. Thus, by having the flange parts 22 which are visually exposed to outside to be in close contact with each other, the appearance of the armature 10 can be improved and, further effects including excellent stability of the bobbins 2 on the teeth 11 and prevention of falling off of the bobbins 22 from the teeth 11 can be acquired.

On the other hand, since the labyrinth gap 5 is formed between the upper flange parts 21 (upper side in FIG. 1) of the adjacent bobbins on the opposite side of the lower flange parts 22, even if there are some dimension errors in the lower flange parts 22, it can be compensated by the labyrinth gap 5. Note that a width of the labyrinth gap 5 is preferred to be smaller than a wire diameter of the winding 3.

However, it is not necessary to form the labyrinth gap 5 between the flange parts 21 of the bobbins 2 like the armature 10 of this embodiment. At least the overlapped section 4 is formed by the first and second protrusions 41 and 42 contacting substantially vertically with each other.

Thus, the gap will not be produced between the adjacent flange parts 21 by forming the overlapped section 4 between the flange parts 21 if a close contact between the first and second protrusions 41 and 42 is provided. Therefore, for example, if molded with the resin, a possibility of the winding 3 entering into the gap and contacting the armature core 1 can be lowered as much as possible even when the winding 3 is moved by a resin pressure.

Further, the overlapped section 4 formed by the first and second protrusions 41 and 42 overlapping with each other may be formed throughout the long side end faces of the adjacent flange parts 21, or only in one or both corners of each flange part 21.

FIG. 3 is a schematic view of an armature 110 according to a comparative example. Note that components of the armature 110 according to this comparative example which are similar to the components of the armature 10 of this embodiment are denoted with the same reference numerals, and a detailed description thereof is omitted.

As shown in FIG. 3, when bobbins 2 of the armature 110 of the comparative example are fitted onto an armature core 1, gaps 210 are formed between adjacent flange parts 21 which are positioned on a yoke 12 side (upper side in FIG. 3).

Therefore, with this configuration, if molded with a resin, there is a possibility that a winding 3 is moved by the resin pressure and enters into the gap 210 to contact the armature core 1, causing degradation in pressure resistance. On the other hand, the armature 10 of the embodiment shown in FIG. 1 can significantly reduce such a possibility and increase in manufacturing yield of the armature 10.

Figure 4A:
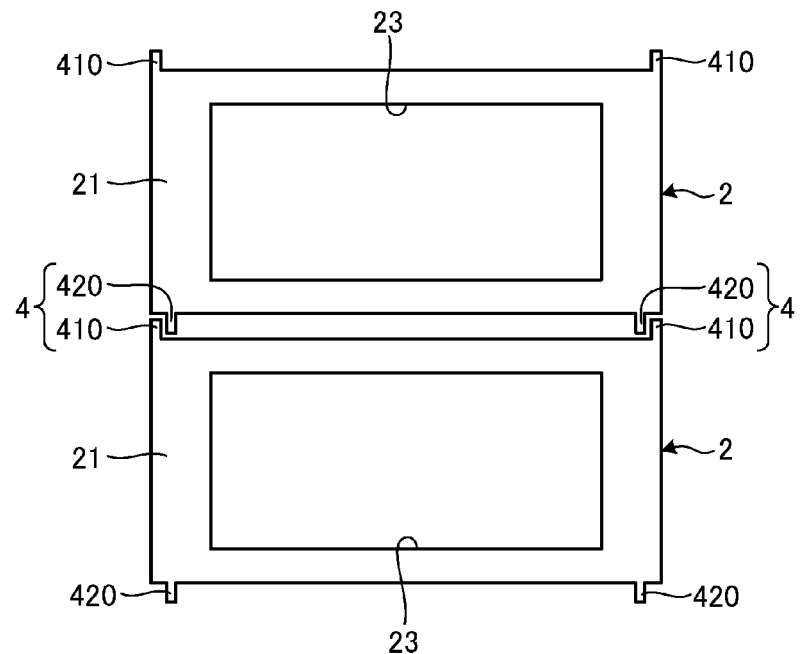
FIG. 4A is a plan view of an overlapped section according to a first modification of the first embodiment.
Figure 4B:
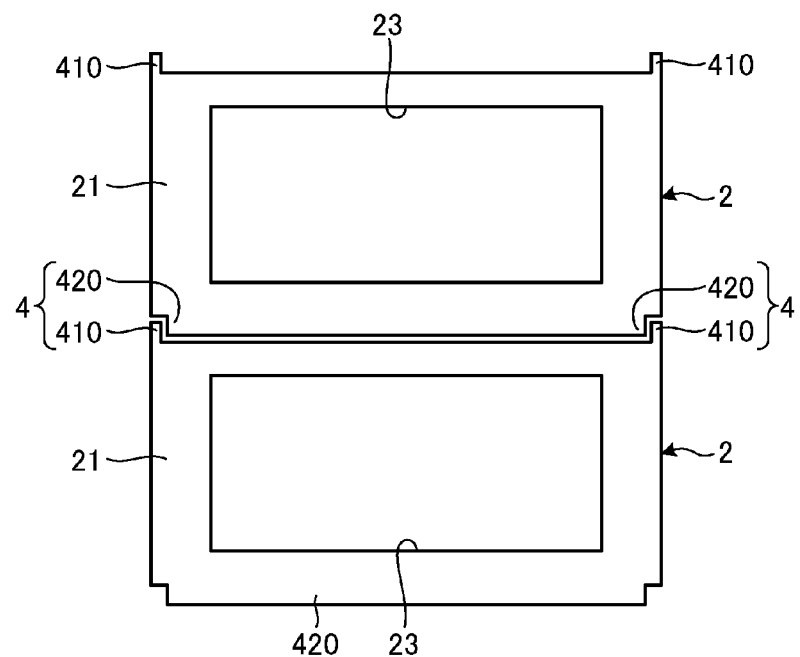
FIG. 4B is a plan view of an overlapped section according to a second modification.
Figure 5A:
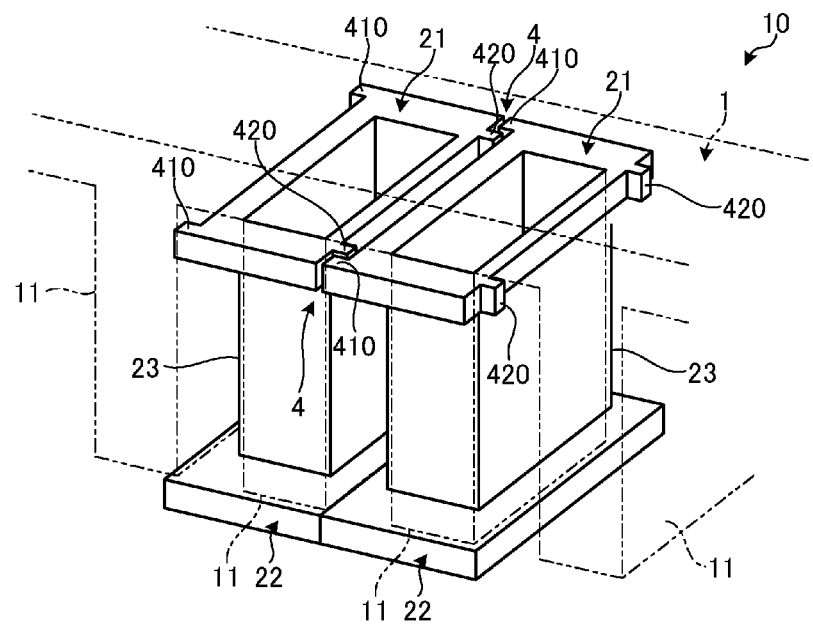
FIG. 5A is a perspective view of the overlapped section according to the first modification.
Figure 5B:
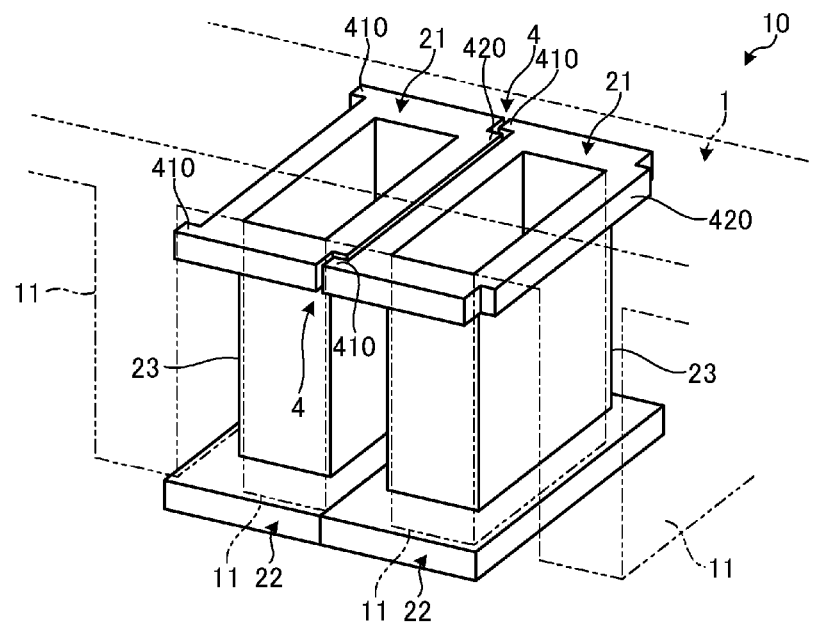
FIG. 5B is a perspective view of the overlapped section according to the second modification.

Here, modifications of the overlapped section 4 of the first embodiment are described. FIGS. 4A and 5A are a plan view and a perspective view of an overlapped section 4 according to a first modification, respectively. FIGS. 4B and 5B are a plan view and a perspective view of another overlapped section 4 according to a second modification, respectively. Note that the windings 3 winding around the bobbins 2 are omitted in FIGS. 5A and 5B.

As shown in FIGS. 4A and 4B, and 5A and 5B, also in the overlapped section 4 of each modification, first and second protrusions 410 and 420 are formed in one of the flange parts 21 and 22 positioned on the yoke 12 side (the upper flange part 21 in FIGS. 5A and 5B).

However, in these first and second modifications, the overlapped section 4 is staggered or overlapped in the width direction of the armature core 1, while the overlapped section 4 of the armature 10 shown in FIG. 1 is staggered or overlapped in the vertical direction (i.e., the extending direction of the teeth 11).

In other words, the overlapped sections 4 shown in FIG. 1 are formed along the long side end faces of the bobbins 2 (i.e., formed in the arrayed direction of the teeth 11 of the armature core 1). The first and second protrusions 41 and 42 overlap in the extending direction of the teeth 11 (i.e., the vertical direction in FIG. 1).

On the other hand, the overlapped sections 4 according to the modifications are formed so as to overlap in a direction (i.e., front-and-rear directions in FIGS. 5A and 5B) perpendicular to the arrayed direction of the teeth 11 of the armature core 1 (i.e., left-and-right directions in FIGS. 5A and 5B). The first and second protrusions 410 and 420 overlap with each other in the width direction of the armature core 1.

In the first modification shown in FIGS. 4A and 5A, the first and second protrusions 410 and 420 forming the overlapped section 4 are both formed only in the corners of one flange part 21. On the other hand, in the second modification shown in FIGS. 4B and 5B, one of the first and second protrusions 410 and 420 forming the overlapped section 4 (the second protrusion 420 in this modification) is formed substantially throughout the long side end face of the flange part 21.

Second Embodiment

Figure 6:
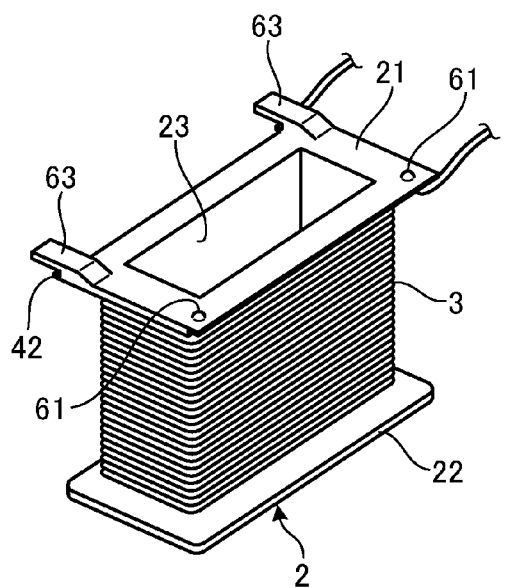
FIG. 6 is a perspective view of a coiled bobbin of an armature according to a second embodiment.
Figure 7:
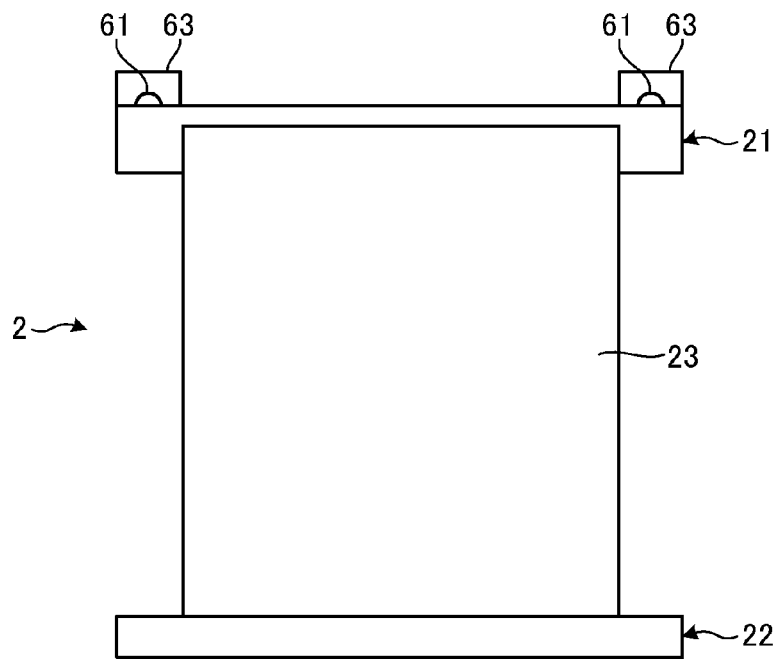
FIG. 7 is a side view of the bobbin shown in FIG. 6.
Figure 8:
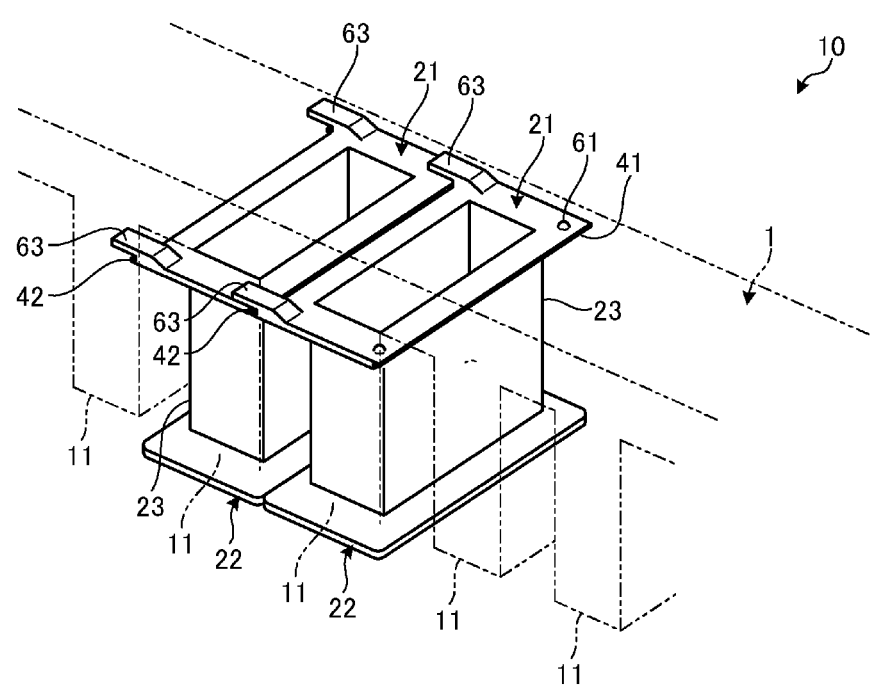
FIG. 8 is a perspective view showing a state where the bobbins are coupled to each other.
Figure 9:
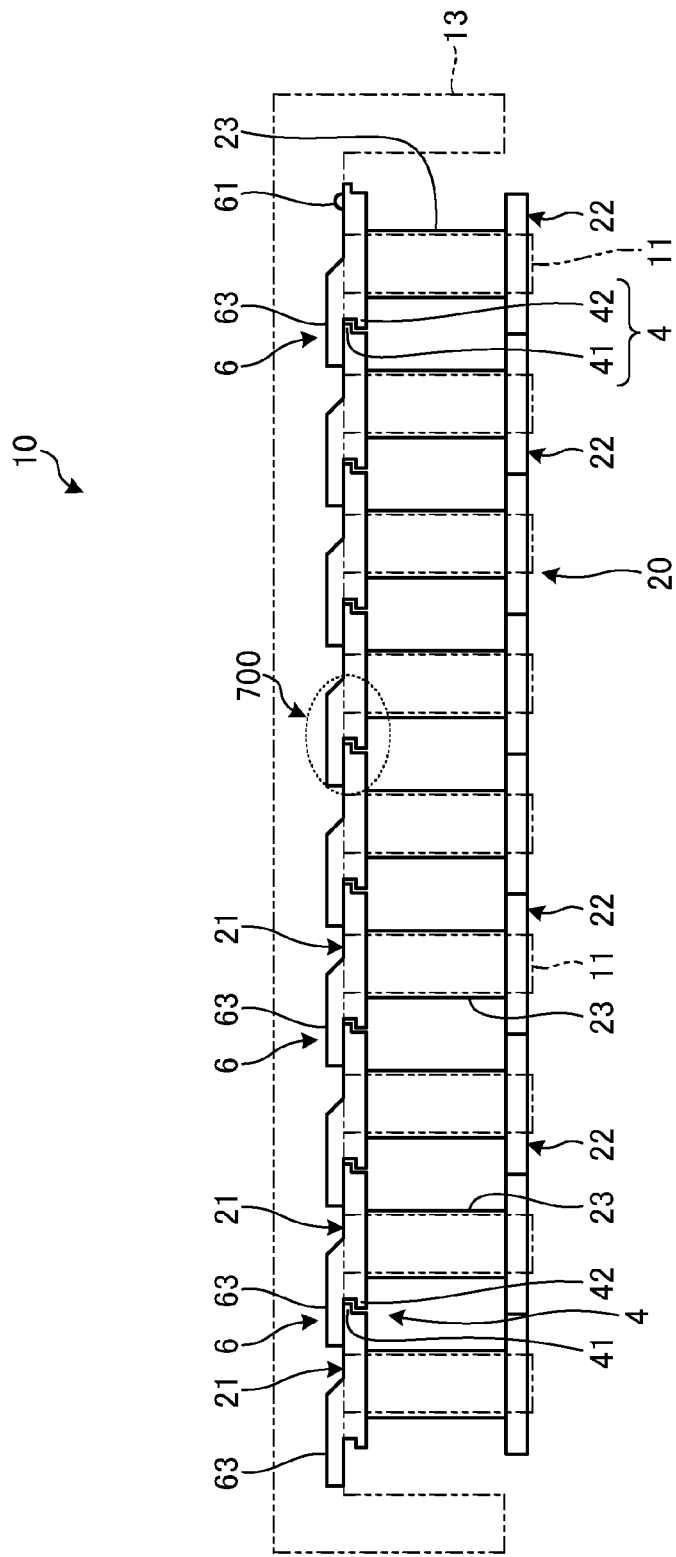
FIG. 9 is an elevational view of the armature.
Figure 10:
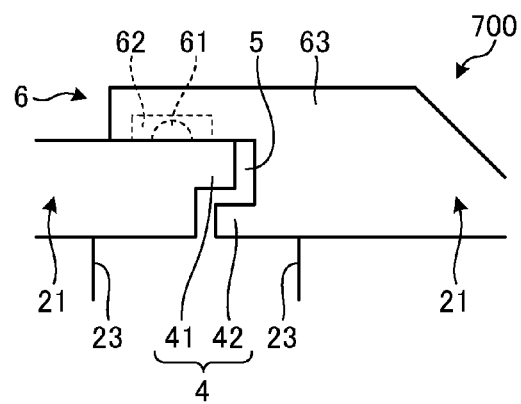
FIG. 10 is a partially enlarged view of FIG. 9.
Figure 11:
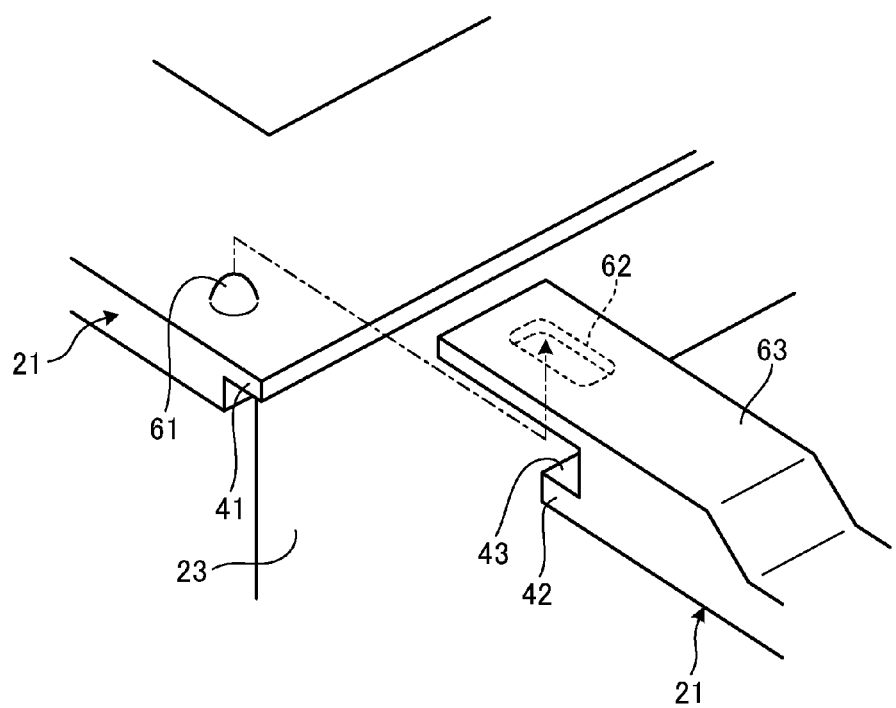
FIG. 11 is a perspective view showing an overlapped section and a coupling portion.
Figure 12:
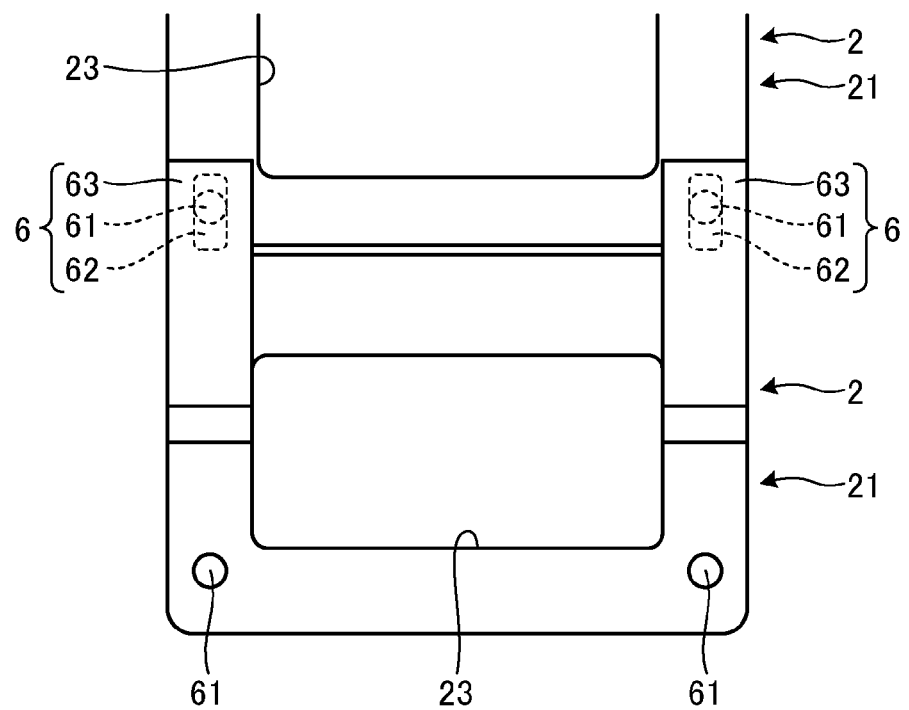
FIG. 12 is a plan view of flange parts of the bobbins.

Next, an armature 10 according to a second embodiment of the invention is described with reference to FIGS. 6 to 12. FIG. 6 is a perspective view of a coiled bobbin 2 of the armature 10 according to the second embodiment. FIG. 7 is a side view of the bobbin 2 shown in FIG. 6. FIG. 8 is a perspective view of the bobbins 2, showing a state where the bobbins 2 are coupled to each other. FIG. 9 is an elevational view of the armature 10. FIG. 10 is a partially enlarged view (700) of FIG. 9. FIG. 11 is a perspective view showing an overlapped section 4 and a coupling portion 6. FIG. 12 is a plan view of flange parts 21 of adjacent bobbins 2.

Note that, in the following description using FIGS. 6 to 12, similar components to the first embodiment are denoted with the same reference numerals and a detailed description thereof is omitted. Further, other than FIG. 6, the windings 3 winding around the bobbins 2 are omitted in the figures.

As shown in FIGS. 6 to 8, similar to the armature 10 of the first embodiment, each bobbin 2 of the armature 10 according to the second embodiment has a rectangular prismatic portion 23 where the windings 3 are wound around, and flange parts 21 and 22 having substantially rectangular frame shapes are formed at both upper and lower ends of the rectangular prismatic portion 23 so that they project radially outward from the ends.

In addition, as shown in FIGS. 8 to 11, the overlapped section 4 of this embodiment is also configured such that a first protrusion 41 is formed in one of long side end faces of the flange part 21, and a second protrusion 42 is formed in the other, opposite long side end face. Here, the first protrusion 41 is formed throughout the one long side end face, and the second protrusion 42 is formed throughout the other opposite long side end face. In other words, the overlapped sections 4 are formed throughout the long side end faces of the bobbins 2.

The difference from the first embodiment is in that the overlapped section 4 of this embodiment has coupling portions 6 for coupling the adjacent bobbins 2 (see FIG. 9).

Each coupling portion 6 includes a hemispherical projection 61 serving as a convex portion formed near one long side of the flange part 21, and an elongated hole 62 serving as a concave portion formed near the other, opposite long side of the flange part 21 and into which the hemispherical projection 61 fits (see FIGS. 10 and 11).

Specifically, as shown in FIGS. 10 to 12, the hemispherical projection 61 is formed at a position on the surface (the top surface of the flange part 21 in FIG. 11) of each corner of the one long side of the flange part 21, and is formed at a slightly inward position from the first protrusion 41.

On the other hand, in the corner of the other long side of the flange part 21, a coupling piece 63 is formed above the second protrusion 42, extending to be overhung from the second protrusion 42 in a short side direction of the flange part 21 (leftward in FIG. 9).

Further, the elongated hole 62 for engaging the hemispherical projection 61 with the coupling piece 63 is formed and, thus, the adjacent bobbins 2 can be coupled to each other. Here, the width of the elongated hole 62 is slightly narrower than the diameter of the hemispherical projection 61 so that the hemispherical projection 61 and the coupling piece 63 can be engaged in a tightly fitted fashion.

Further, since the coupling piece 63 projects as described above, a groove 43 is formed between the coupling piece 63 and the second protrusion 42 in the corner of the other long side of the flange part 21. Thus, in the overlapped section 4 of this embodiment, the first protrusion 41 of the adjacent bobbin 2 is inserted into the groove 43 formed in the corner of the flange part 21 so that a snap-fit is achieved by the fitting of the first protrusion 41 into the groove 43 and the fitting of the hemispherical projection 61 into the elongated hole 62 of the coupling piece 63. Other part of the long side of the flange part 21 simply overlaps on the second protrusion 42 of the adjacent bobbin.

With the configuration including the coupling portions 6 described above, as shown in FIGS. 8 and 9, the bobbins 2 are coupled to each other by the snap-fitting, and two or more coil assemblies are then integrally coupled to assemble a coil unit 20. Thus, the bobbins can be attached to the armature core 1 per coil unit 20, instead of attaching the bobbins per coil assembly.

Thus, a manufacturing process can be achieved, which includes creating the coil unit 20 by serially coupling the bobbins 2 via the coupling portions 6, each bobbin 2 having the flange parts 21 and 22 and wound around by the winding 3 to form a coil; and fitting the coupled bobbins 2 of the coil unit 20 onto the plurality of teeth 11 of the armature core 1, respectively.

According to this manufacturing method of the armature 10, each rectangular prismatic portions 23 of the plurality of coupled bobbins 2 can be substantially simultaneously fitted onto the plurality of teeth 11 of the armature core 1. Therefore, manufacturing efficiency of the armature 10 can be improved.

Figure 13A:
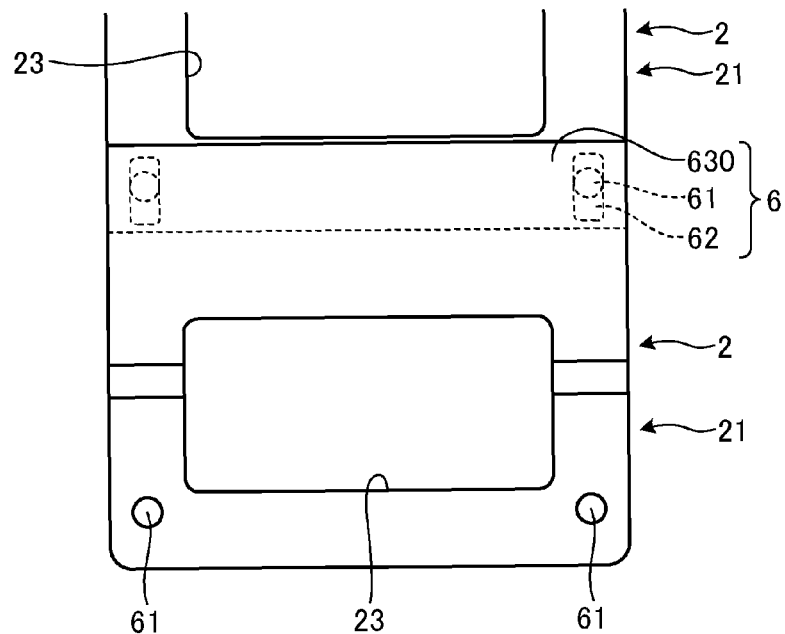
FIG. 13A is a plan view of a coupling portion according to one modification of the second embodiment.

In one modification of the coupling portion 6, a coupling belt 630 may be formed throughout one of the long sides of the flange part 21 as shown in FIG. 13A, instead of forming the coupling pieces 63 at the corners of the flange part 21. In this case, the groove 43 into which the first protrusion 41 of the adjacent bobbin 2 fits is formed in the entire part of the long side of the flange part 21, between the coupling belt 630 and the second protrusion 42.

Figure 13B:
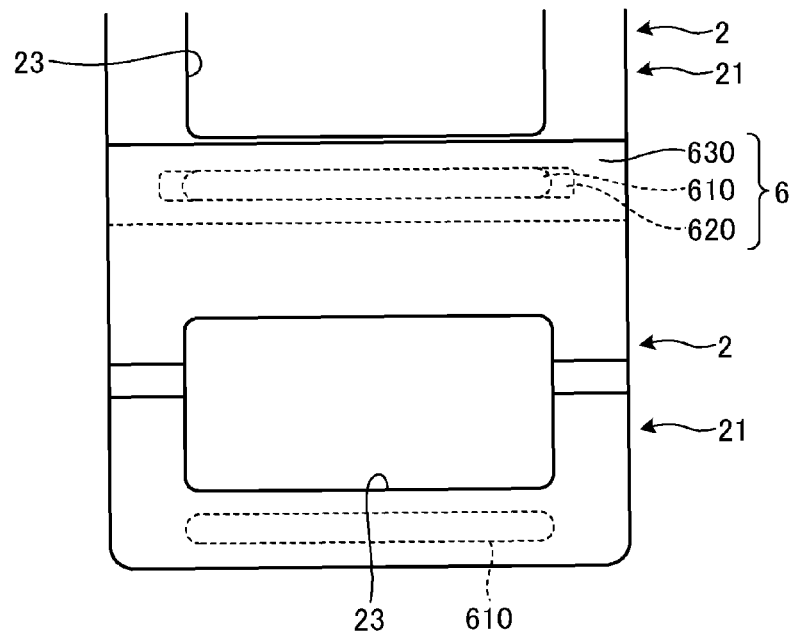
FIG. 13B is a plan view of a coupling portion according to another modification.

Alternatively, as shown in FIG. 13B, a ridge shaped portion 610 having a suitable shape, such as an elongated box shape or an elongated dome shape, may be formed as the convex portion constituting the coupling portion 6, instead of the hemispherical projection 61. Further, an elongated groove 620 as illustrated in FIG. 13B may be formed in the coupling belt 630 as the concave portion corresponding to the ridge shaped portion 610.

In this embodiment, the overlapped section 4 including the first and second protrusions 41 and 42 overlapping with each other also has the coupling portion 6. However, the coupling piece 63 (or the coupling belt 630) which constitutes a part of the coupling portion 6 may be substituted by either one of the first and second protrusions 41 and 42. In this case, the overlapped section 4 is configured by the first and second protrusions 41 and 42 contacting each other.

Next, the linear motor 100 is described with reference to FIG. 14. The linear motor 100 includes a mover 7 constructed by mounting the plurality of coil assemblies or the coil unit 20 where the plurality of coil assemblies are integrally coupled to the armature core 1 having nine teeth 11.

Here, each bobbin 2 of the coil assemblies or the coil unit 20 has the same configuration as that illustrated in FIGS. 6 to 12. That is, the bobbin 2 has the coupling portions 6 in the overlapped sections 4 to couple to adjacent bobbins 2.

Figure 14:
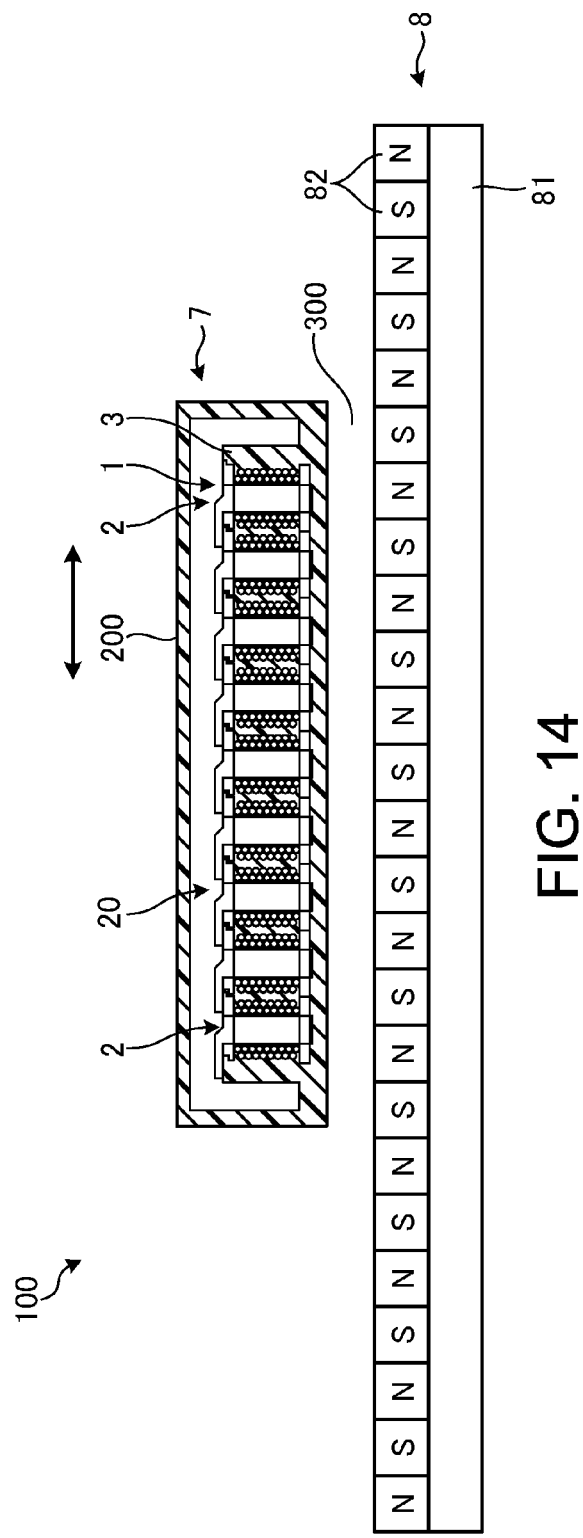
FIG. 14 is a schematic view of a linear motor.

As shown in FIG. 14, the linear motor 100 includes the mover 7 and a stator (magnet track) 8. The mover 7 is constructed by fitting the coil assemblies onto the teeth 11 of the armature core 1 and molding the coil assemblies with the mold resin 200. The stator 8 serves as a magnetic field source opposing to the mover 7 via a predetermined gap 300.

The stator 8 serving as the magnetic field source is constructed by linearly arranging a number of permanent magnets 82 on a given substrate 81. Each magnet solely consists either one of north pole (N) or south pole (S), and the N-pole and S-pole are alternately arrayed.

According to this configuration, when the three phase current is applied to the coil unit 20 of the mover 7, the mover 7 moves along the stator 8. Thus, since travelling magnetic fields are formed around the mover 7 by the armature core 1, a thrust is produced by repulsion and attraction between the traveling magnetic fields and stationary magnetic fields formed by the stator 8 to move the mover 7 along the stator 8 in left-and-right directions in FIG. 14 (see the double-headed arrow). Note that, as illustrated in FIG. 14, the mover 7 can reciprocate by controlling the phases of the current.

Note that, in the linear motor 100 of this embodiment, although the three-phase windings 3 are used, it is not necessarily limited to three phase.

Further, in the linear motor 100 of this embodiment, although the armature 10 is used as the mover 7, a reversed configuration may also be possible, where the armature 10 is used as the stator 8 and the magnetic field source is used as the mover 7.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An armature of a linear motor, comprising:
   an armature core having a plurality of teeth arranged linearly and spaced at predetermined intervals; and
   a plurality of bobbins fitted onto adjacent teeth, each of the bobbins having flange parts, a winding being wound around the bobbin to form a coil,
   wherein at least one of the flange parts of the bobbin is formed with a first protrusion and a second protrusion,
   wherein an overlapped section is formed by the first and second protrusions of two adjacent bobbins contacting or overlapping with each other along adjacent sides of respective flange parts of the two adjacent bobbins, and
   wherein a gap is provided that extends over an entirety of side edge surfaces that extend over an entirety of the adjacent sides of the respective flange parts of the two adjacent bobbins.

2. The armature of claim 1, wherein the first and second protrusions have a staggered shape to overlap with each other.

3. The armature of claim 1, wherein the bobbin has a rectangular prismatic portion where the winding is wound around, and
   wherein the flange part has a substantially rectangular frame shape projecting outwardly from both end faces of the rectangular prismatic portion, and the first protrusion is formed in one of long side end faces of the flange part and the second protrusion is formed in the other opposite long side end face.

4. The armature of claim 1, wherein the overlapped section is formed in at least a corner of the flange part.

5. The armature of claim 4, wherein the overlapped section includes a coupling portion for coupling the two adjacent bobbins.

6. The armature of claim 5, wherein the coupling portion has a convex portion formed near one of the long sides of the flange part, and a concave portion formed near the other opposite long side of the flange part, the concave portion fitting therein a convex portion of a flange part of a second bobbin.

7. The armature of claim 1, wherein the gap is a labyrinth gap formed in the overlapped section between the two adjacent flange parts butt joined to each other.

8. A linear motor, comprising:
   an armature; and
   a magnetic field source comprised of an array of magnets and arranged opposed to the armature,
   wherein the armature includes:
      an armature core having a plurality of teeth arranged linearly and spaced at predetermined intervals; and
      a plurality of bobbins fitted onto adjacent teeth, each of the bobbins having flange parts, a winding being wound around the bobbin to form a coil,
      wherein at least one of the flange parts of the bobbin is formed with a first protrusion and a second protrusion,
      wherein an overlapped section is formed by the first and second protrusions of two adjacent bobbins contacting or overlapping with each other along adjacent sides of respective flange parts of the two adjacent bobbins, and
      wherein a gap is provided that extends over an entirety of side edge surfaces that extend over an entirety of the adjacent sides of the respective flange parts of the two adjacent bobbins.

9. A method of manufacturing an armature, comprising:
   creating a coil unit by serially coupling a plurality of bobbins via coupling portions, each of the bobbins having flange parts and a winding being wound around the bobbin to form a coil; and
   fitting the plurality of coupled bobbins of the coil unit onto teeth of an armature core,
   wherein at least one of the flange parts of the bobbin is formed with a first protrusion and a second protrusion,
   wherein an overlapped section is formed by the first and second protrusions of two adjacent bobbins contacting or overlapping with each other along adjacent sides of respective flange parts of the two adjacent bobbins, and each overlapped section being formed with the coupling portion, and
   wherein a gap is provided that extends over an entirety of side edge surfaces that extend over an entirety of the adjacent sides of the respective flange parts of the two adjacent bobbins.

10. An armature of a linear motor, comprising:
    an armature core having a plurality of teeth arranged linearly and spaced at predetermined intervals and
    a plurality of bobbins fitted onto adjacent teeth, each of the bobbins having flange parts, a winding being wound around the bobbin to form a coil,
    wherein at least one of the flange parts of the bobbin is formed with a first protrusion and a second protrusion,
    wherein an overlapped section is formed by the first and second protrusions of two adjacent bobbins contacting or overlapping with each other along adj acent sides of respective flange parts of the two adjacent bobbins,
    wherein a gap is provided that extends over an entirety of side edge surfaces on the adjacent sides of the respective flange parts of the two adjacent bobbins, and
    wherein the armature core has a yoke, each of the plurality of teeth extending from the yoke in a first direction, and the first and second protrusions overlap each other in a direction parallel to the first direction.

11. An armature of a linear motor, comprising:

an armature core having a plurality of teeth arranged linearly and spaced at predetermined intervals; and a plurality of bobbins fitted onto adjacent teeth, each of the bobbins having flange parts, a winding being wound around the bobbin to form a coil, wherein at least one of the flange parts of the bobbin is formed with a first protrusion and a second protrusion, wherein an overlapped section is formed by the first and second protrusions of two adjacent bobbins contacting or overlapping with each other along adjacent sides of respective flange parts of the two adjacent bobbins, wherein a gap is provided that extends over an entirety of side edge surfaces on the adjacent sides of the respective flange parts of the two adjacent bobbins, and wherein a first flange part of the flange parts of each bobbin is formed with the first protrusion and the second protrusion, a second flange part of the flange parts of each bobbin is not formed with the first protrusion and the second protrusion, and wherein second flange parts of the adjacent bobbins have facing sides that are in direct contact with each other.

12. The linear motor of claim 8, wherein the armature core has a yoke, each of the plurality of teeth extending from the yoke in a first direction, and the first and second protrusions overlap each other in a direction parallel to the first direction.

13. The linear motor of claim 8, wherein a first flange part of the flange parts of each bobbin is formed with the first protrusion and the second protrusion, a second flange part of the flange parts of each bobbin is not formed with the first protrusion and the second protrusion, and wherein second flange parts of the adjacent bobbins have facing sides that are in direct contact with each other.

14. The linear motor of claim 8, wherein the gap is a labyrinth gap formed in the overlapped section between the two adjacent flange parts butt joined to each other.

15. The method of claim 9, wherein the armature core has a yoke, each of the plurality of teeth extending from the yoke in a first direction, and the first and second protrusions overlap each other in a direction parallel to the first direction.

16. The method of claim 9, wherein a first flange part of the flange parts of each bobbin is formed with the first protrusion and the second protrusion, a second flange part of the flange parts of each bobbin is not formed with the first protrusion and the second protrusion, and wherein second flange parts of the adjacent bobbins have facing sides that are in direct contact with each other.

17. The method of claim 9, wherein the gap is a labyrinth gap formed in the overlapped section between the two adjacent flange parts butt joined to each other.

18. The armature of Claim 1,
wherein the flange parts of the two adjacent bobbins have a substantially rectangular frame shape such that the overlapped portion is disposed between adjacent long side end faces of the respective flange parts of the two adjacent bobbins.

19. The armature of Claim 8,
wherein the flange parts of the two adjacent bobbins have a substantially rectangular frame shape such that the overlapped portion is disposed between adjacent long side end faces of the respective flange parts of the two adjacent bobbins.

20. The method of Claim 9,
wherein the flange parts of the two adjacent bobbins have a substantially rectangular frame shape such that the overlapped portion is disposed between adjacent long side end faces of the respective flange parts of the two adjacent bobbins.

* * * * *